(12) United States Patent
Arenburg et al.

(10) Patent No.: US 9,094,509 B2
(45) Date of Patent: Jul. 28, 2015

(54) PRIVACY GENERATION

(75) Inventors: Robert T Arenburg, Round Rock, TX (US); Franck Barillaud, Austin, TX (US); Shiv Dutta, Round Rock, TX (US); Alfredo V Mendoza, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 459 days.

(21) Appl. No.: 13/536,483

(22) Filed: Jun. 28, 2012

(65) Prior Publication Data

US 2014/0003596 A1 Jan. 2, 2014

(51) Int. Cl.
| | | |
|---|---|---|
| *G10L 21/00* | (2013.01) | |
| *H04M 3/42* | (2006.01) | |
| *G10L 13/02* | (2013.01) | |
| *G10L 15/25* | (2013.01) | |
| *G06K 9/00* | (2006.01) | |

(52) U.S. Cl.
CPC .......... *H04M 3/42391* (2013.01); *G10L 13/02* (2013.01); *G10L 15/25* (2013.01); *G06K 9/00288* (2013.01); *H04M 2242/10* (2013.01)

(58) Field of Classification Search
CPC ......... G10L 21/00; G10L 21/06; G10L 13/00; G10L 13/08; G10L 13/066
USPC .......... 704/273, 276, 278, 206, 226, 260, 266
See application file for complete search history.

(56) References Cited

U.S. PATENT DOCUMENTS

| | | | |
|---|---|---|---|
| 7,088,828 B1* | 8/2006 | Bradford et al. | 381/71.1 |
| 7,363,227 B2 | 4/2008 | Mapes-Riordan et al. | |
| 7,376,557 B2 | 5/2008 | Specht et al. | |
| 8,170,229 B2* | 5/2012 | Kesterson | 381/71.8 |
| 2003/0018475 A1* | 1/2003 | Basu et al. | 704/270 |
| 2004/0192243 A1 | 9/2004 | Siegel | |
| 2008/0044036 A1 | 2/2008 | Konchitsky | |
| 2008/0118081 A1 | 5/2008 | Chang | |
| 2009/0190770 A1 | 7/2009 | Kesterson | |
| 2010/0131268 A1 | 5/2010 | Moeller | |
| 2010/0226491 A1 | 9/2010 | Conte et al. | |
| 2011/0060584 A1 | 3/2011 | Ferrucci et al. | |
| 2011/0071830 A1 | 3/2011 | Kim et al. | |

OTHER PUBLICATIONS

Dana, S. S. et al., IPCOM000102166D, "Combined Microphone and Capacitance Meter for Computer Lip Reading", published Mar. 17, 2005.
Sarah Gingichashvili, Criminal Beware: Computerized Lip Reading, http://thefutureofthings.com/news/1089/criminals-beware-computerized-lip-reading.html, Jan. 16, 2008.
Herman Miller, Inc. Sound Masking in the Office:Reducing Noise Distractions to Increase Worker Productivity, http://www.hermanmiller.com/MarketFacingTech/hmc/solution_essays/assets/se_Sound_Masking_in_the_Office.pdf, 2002.

(Continued)

*Primary Examiner* — Qi Han
(74) *Attorney, Agent, or Firm* — Kunzler Law Group

(57) ABSTRACT

For generating privacy, a detection module detects an optical lingual cue from user speech that comprises an audible signal. A generation module transmits an inverse audible signal generated from the optical lingual cue.

14 Claims, 4 Drawing Sheets

(56) References Cited

OTHER PUBLICATIONS

Ideaconnection, Lip Reading Software that Recognizes Multiple Languages, http://www.ideaconnection.com/new-inventions/lip-reading-software-that-recognizes-multiple-languag-02394.html, Apr. 29, 2009.

David Smith, Lipreader 8—Interactive computer software for lip-reading students and teachers, What is Lipreader 8?, http://www.lipreader.co.uk/, Last retrieved Feb. 2012.

* cited by examiner

US 9,094,509 B2

PRIVACY GENERATION

BACKGROUND

1. Field

The subject matter disclosed herein relates to privacy generation and more particularly relates to generating telephone conversation privacy.

2. Description of the Related Art

Telephones allow users to have telephone conversations anywhere. However, users, and those nearby, often would prefer that the conversations were private.

BRIEF SUMMARY

A method for privacy generation is disclosed. A detection module detects an optical lingual cue from user speech that comprises an audible signal. A generation module transmits an inverse audible signal generated from the optical lingual cue. In one embodiment, the method includes generating a simulated signal from a speech model and the optical lingual cue, transmitting the simulated signal, and generating the inverse audible signal from the simulated signal. In another embodiment, the method also includes receiving combined audible signals and updating the speech model from the combined audible signals. In another embodiment, the combined audible signals are received from a direction microphone. In another embodiment, the method includes detecting a training optical lingual cue, receiving a training audible signal, and generating the speech model from the training optical lingual cue and the training audible signal. In another embodiment, the optical lingual cue includes at least one of positions and movements of the lips, mouth, and tongue, throat vibrations, and facial movements. In another embodiment, the transmitted inverse audible signal anticipates the audible signal by a specified time interval. In yet another embodiment, the inverse audible signal is directional.

A computer program product for privacy generation is included. The computer program product includes computer readable storage medium having computer readable program code embodied therein. The computer readable program code is configured to detect an optical lingual cue from user speech that comprises an audible signal and transmit an inverse audible signal generated from the optical lingual cue.

A system for privacy generation includes a telephone. The telephone includes a detection module detecting an optical lingual cue from user speech that comprises an audible signal and a generation module transmitting an inverse audible signal generated from the optical lingual cue. In one embodiment, the generation module also generates a simulated signal from a speech model and the optical lingual cue, transmits the simulated signal, and generates the inverse audible signal from the simulated signal. In a further embodiment, the generation module also receives combined audible signals and updates the speech model from the combined audible signals. In another embodiment, the detection module detects a training optical lingual cue and the generation module receives a training audible signal and generates the speech model from the training optical lingual cue and the training audible signal.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
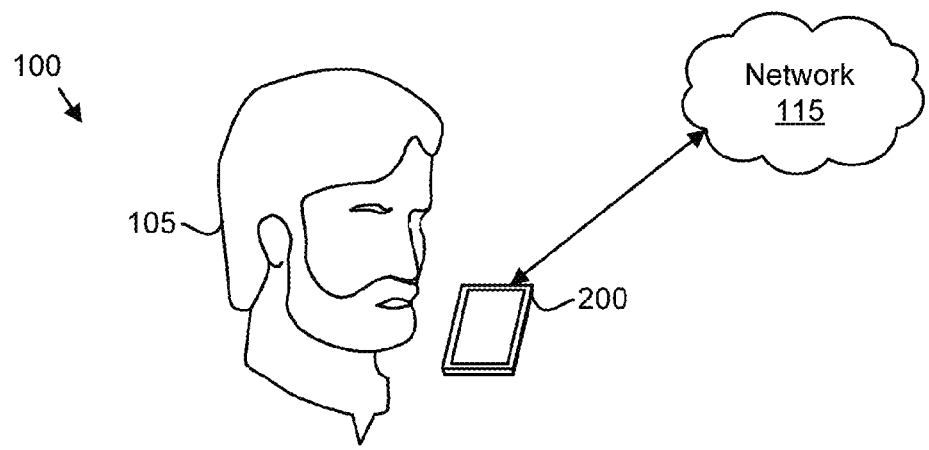
FIG. 1 is a drawing illustrating one embodiment of a telephone system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

FIG. 1 is a drawing illustrating one embodiment of a telephone system 100. The system 100 includes a telephone 200 and a network 115. A telephone 200 may be a mobile telephone and the network 115 may be a mobile telephone network. Alternatively, the telephone 200 may be embodied in a computer such as a laptop computer, a computer workstation, tablet computer, or the like. In addition, the network 115 may be a local area network, a wide-area network, the Internet, or the like. In a certain embodiment, the telephone 200 is a landline telephone and the network 115 is a landline network.

A user 105 communicates through the telephone 200 by speaking into the telephone 200. Unfortunately, when the user 105 is in a public place, the user's speech is not private and may be heard by others nearby. This lack of privacy may be disconcerting both to the user 105 and to the others.

When the user 105 speaks, optical lingual cues are generated. The optical lingual cues may include but are not limited to the movement and position of the user's lips, mouth, and tongue, user facial expressions, throat vibrations, and combinations thereof.

The embodiments described herein generates privacy for the telephone conversation by detecting an optical lingual cue from the user speech and transmitting an inverse audible signal generated from the lingual cue as will be described hereafter. The inverse audible signal cancels the audible signal of the user speech, generating privacy for the user's conversation.

Figure 2:
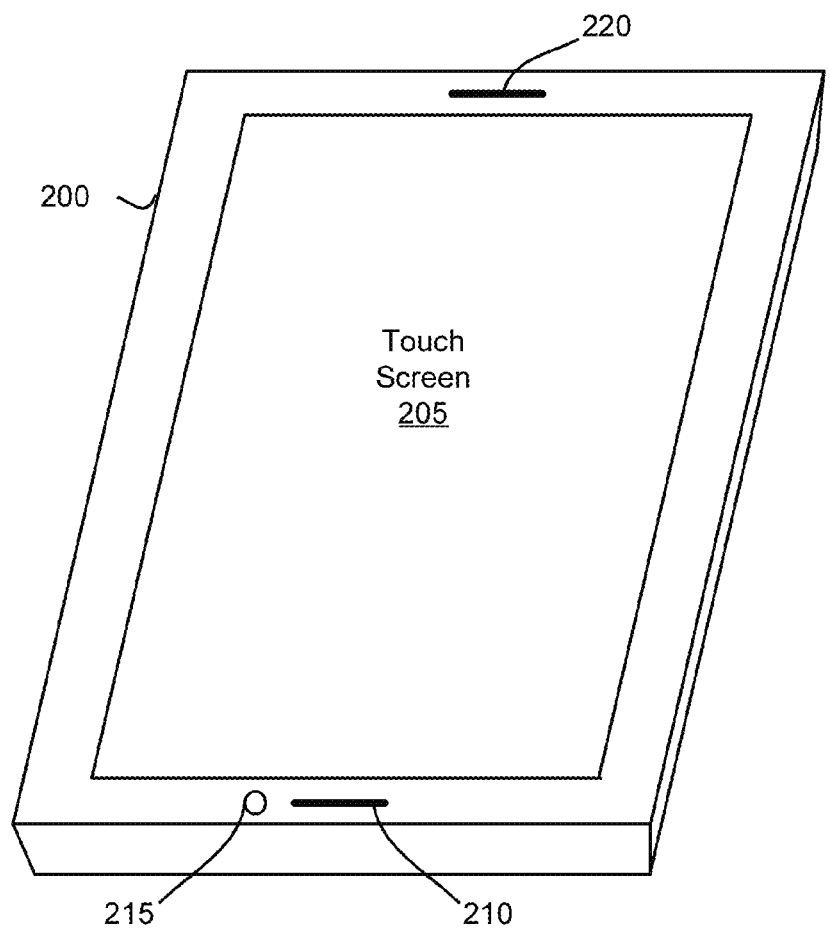
FIG. 2 is a drawing illustrating one embodiment of a telephone.

FIG. 2 is a drawing illustrating one embodiment of a telephone 200. The telephone 200 is the telephone of FIG. 1. In the depicted embodiment, the telephone 200 includes a touchscreen 205, a microphone 210, an electronic eye 215, and a speaker 220. The electronic eye 215 may be a still camera, a video camera, or the like. In a certain embodiment, the electronic eye 215 includes a laser, such as infrared laser. The laser may be projected on the throat of the user 105. The electronic eye 215 may further record motions of the laser on the throat to detect vibrations of the throat. One of skill in the art will recognize that embodiments may be practiced with the electronic eye 215, the microphone 210, and the speaker 220 disposed an alternate positions on the telephone 200.

The microphone 210 may be directional microphone. In one embodiment, the microphone 210 determines the position of the user 105 relative to the telephone 200. Alternatively, the microphone 210 may determine a position of others in the vicinity. The electronic eye 215 may also determine the position of the user 105 relative to the telephone 200.

Figure 3:
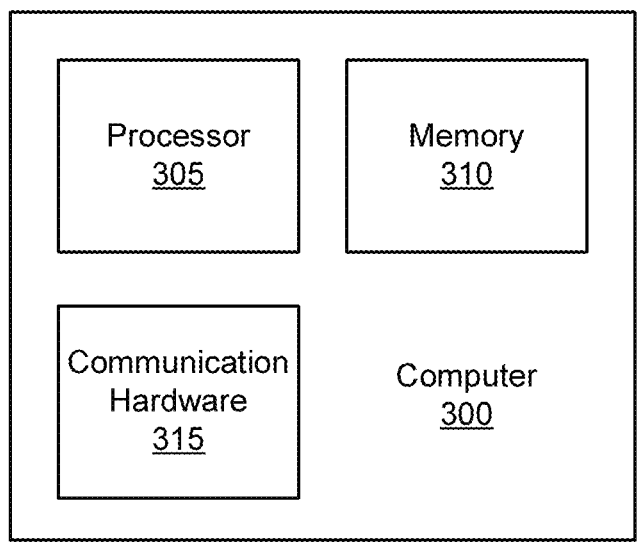
FIG. 3 is a schematic block diagram illustrating one embodiment of a computer.

FIG. 3 is a schematic block diagram illustrating one embodiment of a computer 300. The computer 300 may be embodied in the telephone 200 of FIG. 2. The computer includes a processor 305, a memory 310, and communication hardware 315.

The memory 310 may store computer readable program code. The memory may be a semiconductor storage device, a hard disk drive, an optical storage device, a micromechanical storage device, a holographic storage device, or combinations thereof. The processor 305 may execute computer readable program code. The communication hardware 315 may communicate with other devices.

Figure 4:
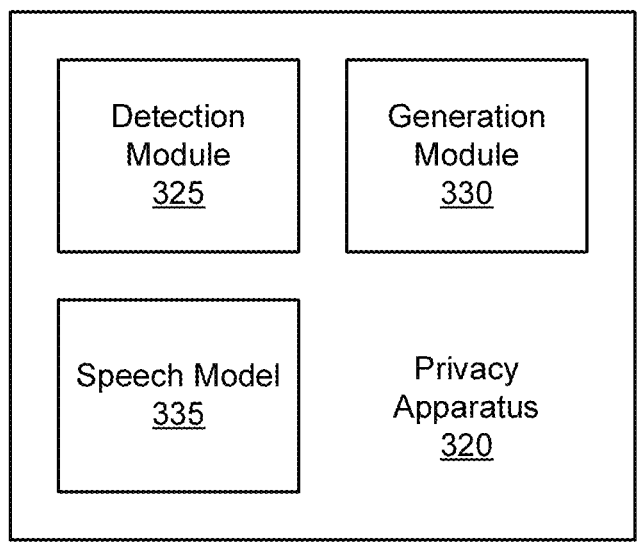
FIG. 4 is a schematic block diagram illustrating one embodiment of a privacy apparatus.

FIG. 4 is a schematic block diagram illustrating one embodiment of a privacy apparatus 320. The apparatus 320 may be embodied in the telephone 200 of FIG. 2, the computer 300 of FIG. 3, or combinations thereof. The apparatus 320 includes a detection module 325, a generation module 330, and a speech model 335.

In one embodiment, the detection module 325, the generation module 330, and the speech model 335 are embodied in computer readable program code stored in a computer readable storage device such as the memory 310. The computer readable program code may be executed by the processor 305 to perform the functions of the apparatus 320.

The detection module 325 detects an optical lingual cue from user speech that comprises an audible signal. The generation module 330 transmits an inverse audible signal generated from the optical cue. The inverse audible signal may have the same frequency as the user speech, but an opposite amplitude. As a result, the inverse audible signal cancels out the audible signal of the user speech so that a user speech may not be heard and/or understood by others in the vicinity. As a result, the apparatus 320 generates privacy for the user 105 as will be described hereafter.

The speech model 335 may convert one or more optical lingual cues into a simulated signal. The simulated signal may be a digital representation of the user speech. The speech model 335 may associate a plurality of optical lingual cues with a plurality of phonemes. In addition, the speech model 335 may include one or more lingual-cue-to-speech algorithms. Each lingual-cue-to-speech algorithm may combine one or more phonemes identified from the optical lingual cues to form a simulated signal that replicates the audible signal of the user speech.

In an alternate embodiment, the speech model 335 converts one or more optical lingual cues into text. The speech model 335 may further convert the text into speech. The speech model 335 may employ a text-to-speech algorithm associated with the user 105 to the convert the text into the simulated signal.

Figure 5:
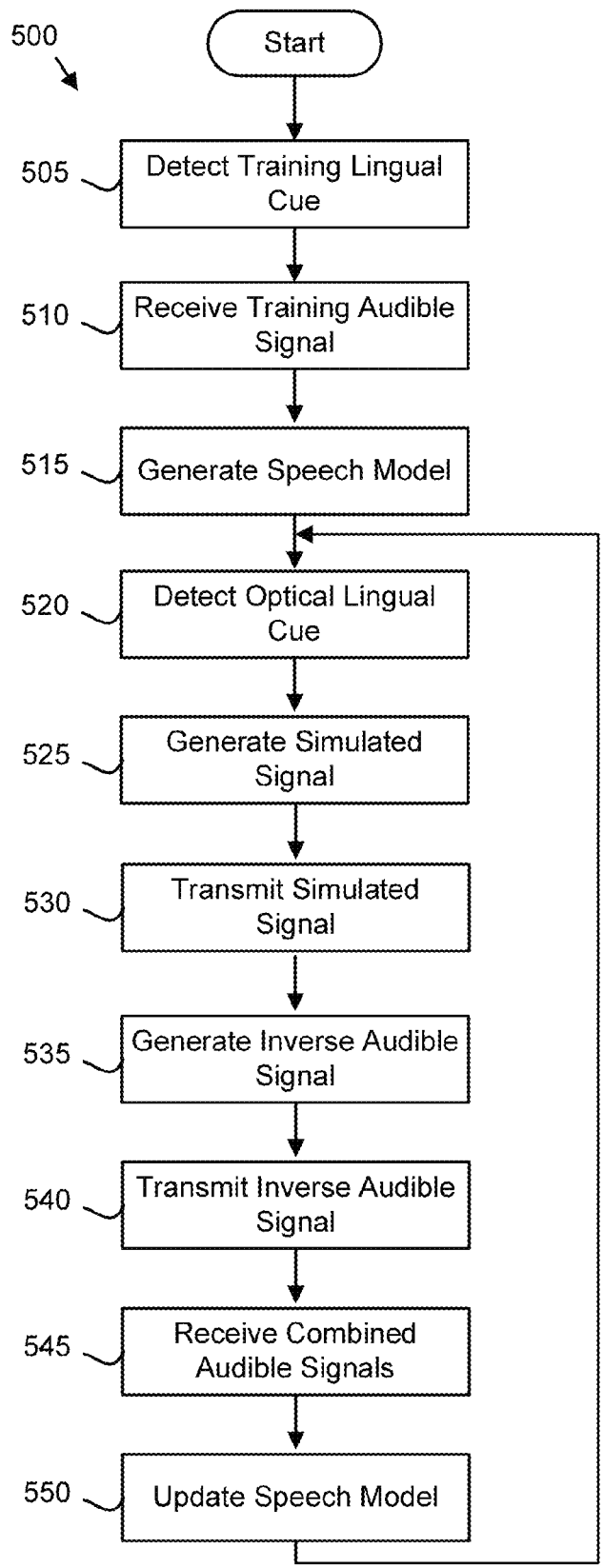
FIG. 5 is a schematic flow chart diagram illustrating one embodiment of a privacy generation method.
Figure 6A:
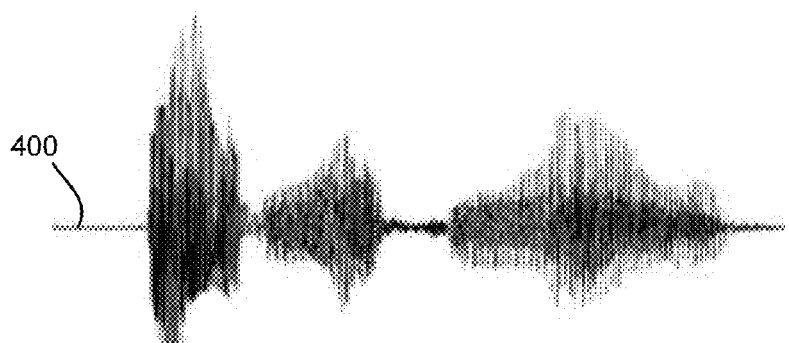
FIGS. 6A-D are representations of embodiments of signals.
Figure 6B:
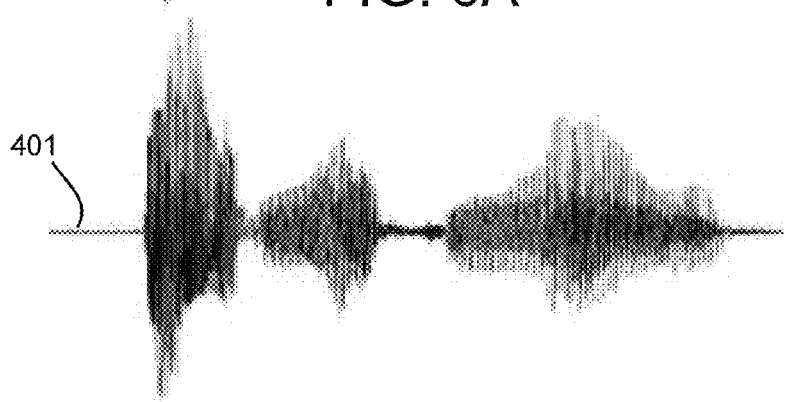
Figure 6C:
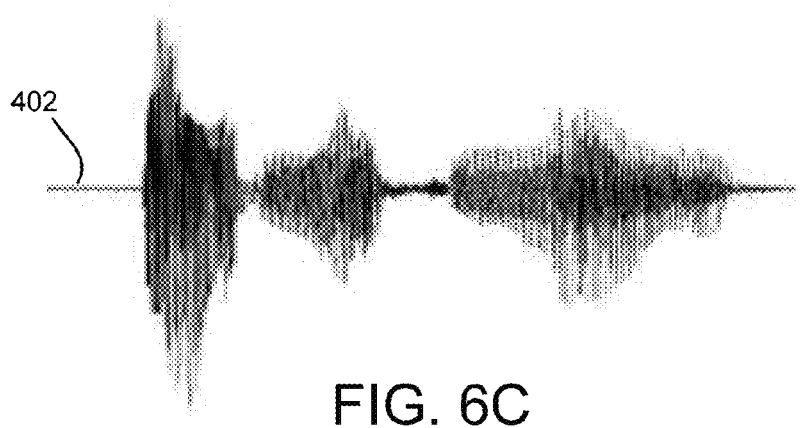
Figure 6D:

FIG. 5 is a schematic flow chart diagram illustrating one embodiment of a privacy generation method 500. The method 500 may perform the functions of the system 100 and apparatus 320 of FIGS. 1 and 4 respectively. The method may be performed by a computer readable storage medium. The computer readable storage medium may be the memory 310 and may store the computer readable program code. The computer readable program code when executed by the processor 305 may perform the method 500.

The method 500 starts, and in one embodiment the detection module 325 detects 505 a training optical lingual cue. The training optical lingual cue may be from user speech while the user 105 reads training text. In one embodiment, the generation module 330 prompts the user 105 to read the training text during a training mode. For example, the generation module 330 may prompt the user 105 to read the training text when the user 105 initially uses the method 500 and/or uses the telephone 200.

The generation module 330 further receives 510 a training audible signal. The training audible signal may also be from the user speech while the user 105 reads the training text.

The generation module 330 may generate 515 the speech model 335 from the training optical lingual cue and the training audible signal. In one embodiment, the generation module 330 associates at least one training optical lingual cue with at least one phoneme in the training audible signal. The generation module 330 may further store the at least one training optical lingual cue and associated with the at least one phoneme in the speech model 335.

In one embodiment, the detection module 325 detects 520 an optical lingual cue from the user speech. The user speech comprises an audible signal. The optical lingual cue may be correlated to the audible signal.

In one embodiment, the detection module 325 includes the electronic eye 215. The electronic eye 215 may record a video sequence of one or more lingual cues. The electronic eye 215 may record the positions and movements of the user's lips, mouth, and tongue. Alternatively, electronic eye 215 may record the user's facial expressions.

In a certain embodiment, the electronic eye 215 records vibrations of the user's throat. The electronic eye 215 may record the vibrations from successive images of the user's throat. Alternatively, electronic eye 215 may illuminate the user's throat with a light source such as an infrared laser and record the motions of the light source on the throat.

The detection module 325 may parse one or more optical lingual cues from images and/or sequences of images recorded by the electronic eye 215. In one embodiment, the detection module 325 compares the recorded images to images of optical lingual cues stored in the speech model 335 to detect 520 the optical lingual cues.

In one embodiment, the generation module 330 generates 525 a simulated signal from the speech model 335 and the optical lingual cue. The simulated signal may be a digital representation of the user speech. In one embodiment, a least one lingual-cue-to-speech algorithm selects at least one phoneme from the speech model 335 that corresponds to the optical lingual cue. The at least one lingual-cue-to-speech algorithm may further concatenate a plurality of phonemes corresponding to a sequence of optical lingual cues to form a sequence of phonemes. In one embodiment, the at least one lingual-cue-to-speech algorithm may smooth transitions between the phonemes to form the simulated signal that is representative of the user speech.

In an alternate embodiment, the generation module 330 generates 525 the simulated signal by converting a plurality of optical lingual cues into text. The generation module 330 may further employ the speech model 335 to convert the text into the simulated signal that is representative of audible signal of the user speech.

In one embodiment, the generation module 330 transmits 530 the simulated signal. The generation module 330 may transmit 530 to simulated signal electronically through the telephone 200. In a certain embodiment, although the microphone 210 receives the user speech, the generation module 330 may not transmit the received user speech through the telephone 200. Instead, the generation module 330 may only transmit 530 the simulated signal.

In one embodiment, the generation module 330 generates 535 an inverse audible signal. The inverse audible signal may be generated from the optical lingual cue using the speech model 335. In one embodiment, the inverse audible signal is the inverse of the simulated signal. The inverse audible signal may have the frequency response of the simulated signal with an inverse amplitude. In one embodiment, the amplitude of the inverse audible signal is scaled to match an expected amplitude of the audible signal of the user speech.

The generation module 330 further transmits 540 the inverse audible signal. The inverse audible signal may be transmitted 540 through the speaker 220.

The transmitted inverse audible signal has a frequency response that is representative of the user speech. However the amplitude of the inverse audible signal is inverse to the user speech. As a result, the inverse audible signal cancels out the user speech, so that a user speech is not heard by others around the user 105. As a result, privacy is generated for the user 105 and the user's conversation.

In one embodiment, the inverse audible signal is a directional signal. The speaker 220 may comprise a plurality of speakers. The inverse audible signal may be sent with the first phase to a first speaker and a second delayed phase to a second speaker to generate the directional signal. For example, the inverse audible signal may be directional front to back. Alternatively, the inverse audible signal may be directional from side to side. The speech model 335 may incorporate the position of the user 105 to determine the directionality of the inverse audible signal.

In one embodiment, the generation module 330 receives 545 combined audible signals. The combined audible signals may comprise the audible signal from the user speech and the inverse audible signal. The combined audible signals may be received through the microphone 210.

The generation module 330 may update 550 the speech model 335 from the combined audible signals. For example, the generation module 330 may correct the speech model 335 by calculating a difference between the audible signal and the inverse audible signal and modifying the phonemes and/or algorithms of the speech model 335 so that the simulated signal will more closely match the audible signal. The method 500 may loop to detect 520 the optical lingual cue.

In one embodiment, the generation module 330 modifies the amplitude of the inverse audible signal so that an average amplitude of the audible signal matches an average amplitude of the inverse audible signal.

In one embodiment, the transmitted inverse audible signal anticipates the audible signal of the user speech by a specified time interval. The electronic eye 215 may measure the distance between the user and the telephone 200 and/or the speaker 220. The generation module 330 may calculate the time interval required for sound to travel from the telephone 200 and/or speaker 220 to the user's mouth. The generation module 330 may transmit 540 the inverse audible signal to anticipate the audible signal.

FIGS. 6A-D are representations of one embodiment of signals 400-403. The signals 400-403 include the audible signal 400 in FIG. 6A, the simulated signal 401 in FIG. 6B, the inverse audible signal 402 in FIG. 6C, and the combined audible signals 403 in FIG. 6D. The audible signal 400 is generated as part of the user speech. The generation module 300 generates 525 the simulated signal 401 from the speech model 335 and the optical lingual cue. The simulated signal 401 is representative of the audible signal 400.

The generation module 330 further generates 535 the inverse audible signal 402 from the speech model 335 and the optical lingual cue. In one embodiment, the inverse audible signal 402 is the inverse of the simulated signal 401.

The combined audible signals 403 includes both the audible signal 400 from the user speech and the inverse audible signal 402 transmitted by the speaker 220. The combined audible signals 403 may be received by the microphone 210. In one embodiment, filters are applied to the combined audible signals 403 to remove environmental sounds. The combined audible signals 403 may be used to update 550 the speech model 335.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for privacy generation comprising:
   detecting, by use of a processor, a training optical lingual cue in response to a user reading a training text;
   receiving a training audible signal in response to the user reading the training text;
   generating a speech model from the training optical lingual cue and the training audible signal, the speech model associating at least one training optical lingual cue with at least one phoneme;
   detecting, based on the speech model, one or more optical lingual cues from user speech that comprises an audible signal;
   generating a simulated signal from the speech model and the one or more optical lingual cues by selecting at least one phoneme from the speech model that corresponds to the one or more optical lingual cues;
transmitting the simulated signal;
generating an inverse audible signal from the simulated signal, the inverse audible signal having a frequency response of the simulated signal with an amplitude inverse of the amplitude of the simulated signal; and
transmitting the inverse audible signal.

2. The method of claim 1, further comprising:
receiving combined audible signals; and
updating the speech model from the combined audible signals.

3. The method of claim 2, wherein the combined audible signals are received from a direction microphone.

4. The method of claim 1, the optical lingual cue comprising at least one of positions and movements of the lips, mouth, and tongue, throat vibrations, and facial movements.

5. The method of claim 1, wherein the transmitted inverse audible signal anticipates the audible signal by a specified time interval.

6. The method of claim 1, wherein the inverse audible signal is directional.

7. A computer program product for privacy generation, the computer program product comprising a computer readable storage medium having computer readable program code embodied therein, the computer readable program code configured to:
detect a training optical lingual cue in response to a user reading a training text;
receive a training audible signal in response to the user reading the training text;
generate a speech model from the training optical lingual cue and the training audible signal, the speech model associating at least one training optical lingual cue with at least one phoneme;
detect, based on the speech model, one or more optical lingual cues from user speech that comprises an audible signal;
generate a simulated signal from the speech model and the one or more optical lingual cues by selecting at least one phoneme from the speech model that corresponds to the one or more optical lingual cues;
transmit the simulated signal;
generate an inverse audible signal from the simulated signal, the inverse audible signal having a frequency response of the simulated signal with an amplitude inverse of the amplitude of the simulated signal; and
transmit the inverse audible signal.

8. The computer program product of claim 7, the computer readable program code further:
receiving combined audible signals; and
updating the speech model from the combined audible signals.

9. The computer program product of claim 8, wherein the combined audible signals are received from a direction microphone.

10. The computer program product of claim 7, the optical lingual cue comprising at least one of positions and movements of the lips, mouth, and tongue, throat vibrations, and facial movements.

11. The computer program product of claim 7, wherein the transmitted inverse audible signal anticipates the audible signal by a specified time interval.

12. The computer program product of claim 7, wherein the inverse audible signal is directional.

13. A system comprising:
a telephone comprising:
 a detection module that detects a training optical lingual cue in response to a user reading a training text and receives a training audible signal in response to the user reading the training text, the detection module generating a speech model from the training optical lingual cue and the training audible signal, the speech model associating at least one training optical lingual cue with at least one phoneme, the detection module further detecting, based on the speech model, one or more optical cues from user speech that comprises an audible signal; and
 a generation module that generates a simulated signal from the speech model and the one or more optical lingual cues by selecting at least one phoneme from the speech model that corresponds to the one or more optical lingual cues, the generation module transmitting the simulated signal and generating an inverse audible signal from the simulated signal, the inverse audible signal having a frequency response of the simulated signal with an amplitude inverse of the amplitude of the simulated signal, the generation module transmitting the inverse audible signal.

14. The system of claim 13, the generation module further receiving combined audible signals and updating the speech model from the combined audible signals.

* * * * *